United States Patent [19]

Barter et al.

[11] 3,988,261

[45] Oct. 26, 1976

[54] FROZEN ORGANIC PEROXIDE EMULSION

[75] Inventors: James A. Barter; Henry C. Stevens, both of Akron, Ohio; John F. Van Hoozer, Bethel Park, Pa.

[73] Assignee: PPG Industries, Inc., Pittsburgh, Pa.

[22] Filed: July 28, 1975

[21] Appl. No.: 599,797

[52] U.S. Cl. .......................... 252/431 C; 252/426; 526/202; 526/344; 526/348
[51] Int. Cl.² .......................................... C08F 4/34
[58] Field of Search ........................ 252/426, 431 C

[56] References Cited
UNITED STATES PATENTS

| | | | |
|---|---|---|---|
| 3,520,825 | 7/1970 | Koehler et al. | 252/426 |
| 3,775,341 | 11/1973 | Barter | 252/426 |
| 3,795,630 | 3/1974 | Jaspers et al. | 252/426 |
| 3,825,509 | 7/1974 | Miller | 252/426 X |

*Primary Examiner*—Patrick P. Garvin
*Attorney, Agent, or Firm*—Irwin M. Stein

[57] ABSTRACT

A solid, frozen organic peroxide emulsion comprising from 30 to 75 weight percent organic peroxide, an emulsifying amount of surfactant(s) and the remainder water is described. Organic peroxides described include: dialkyl peroxydicarbonates, e.g., di-secondarybutyl peroxydicarbonate, diacyl peroxides, e.g., diisobutyryl peroxide, and acyl sulfonyl peroxides, e.g., acetylcyclohexylsulfonyl peroxide. The surfactant can be anionic, cationic, or nonionic, preferably nonionic, or mixtures of compatible surfactants.

20 Claims, No Drawings

3,988,261

FROZEN ORGANIC PEROXIDE EMULSION

DESCRIPTION OF THE INVENTION

The polymerization of ethylenically unsaturated materials susceptible to free-radical polymerization, e.g., unsaturated vinyltype monomers, such as vinyl chloride, with organic peroxides is well recorded in literature and has found extensive commercial application. Polymerization of vinyl chloride, for example, occurs in many parts of the world some of which are remote from the source of organic peroxide manufacture.

It is axiomatic that organic peroxides are unstable compounds and that their instability increases with their reactivity. Highly reactive organic peroxides have the disadvantage of decomposing, often rapidly at room temperature. It is that instability which renders them especially useful as polymerization initiators at relatively mild, e.g., 20°–60° C., polymerization temperatures. Consequently, special precautions are taken during the preparation, shipment and storage of highly reactive organic peroxides. In many cases, it is necessary to provide for shipment and storage of such peroxides in solvents and at less than ambient temperature in order to insure against loss of assay from slow decomposition or from the hazard of an autoaccelerative decomposition. Less reactive organic peroxides, such as lauroyl peroxide and dibenzoyl peroxide, are more stable at room temperature and accordingly can be shipped and stored with greater facility and with less stringent precautions. Such less reactive organic peroxides are commonly used as the initiators for polymerizations that are conducted in geographic areas removed from the source of organic peroxide manufacture because of the aforementioned greater facility respecting shipment. However, their greater stability at room temperature makes them less efficient as polymerization initiators at the aforementioned relatively mild polymerization temperatures.

Highly reactive organic peroxides are often prepared and shipped as solutions in compatible solvents, e.g., mineral spirits or other hydrocarbons such as hexane, cyclohexane, toluene, etc. Diluting highly reactive organic peroxides in hydrocarbon solvents generally reduces the hazards associated with an autoaccelerative decomposition of the peroxide; however, such solutions must still be maintained at less than ambient temperature to preserve assay. Shipment of dilute hydrocarbon solutions of organic peroxides has several disadvantages. First, the organic peroxide and solvent may phase separate at low temperatures, thereby providing a concentrated mass of the organic peroxide, which can be hazardous. Second, in the event of a spill a volatile solvent can evaporate leaving a residue of relatively undiluted peroxide - a hazardous condition. Third, in the event of a fire, the solvent, which is usually flammable, contributes to the conflagration. Fourth, shipment of the solvent content of the solution adds an undesirable economic burden. Finally, in some polymerizations, the presence of the solvent may not be desirable.

Some highly reactive percarbonates, such as diisopropyl peroxydicarbonate, di-n-propyl peroxydicarbonate and di-secondarybutyl peroxydicaarbonate, are shipped as a frozen solid or an undiluted liquid under refrigeration. This method of shipment requires special handling techniques because of the concentrated nature of the peroxide. However, highly reactive organic peroxides are preferred for many polymerizations for the reason that they are more efficient at the polymerization temperatures utilized than the less reactive initiators and consequently result in shorter polymerization times per batch of polymer produced.

It has been suggested that the storage and handling of organic peroxides by the end user can be facilitated by preparing an emulsion or dispersion of the initiator. See, U.S. Pat. No. 3,825,509, which describes an organic peroxide aqueous emulsion in which the peroxide is present in an amount up to 19 percent by weight. The surfactant used is a combination of polyvinyl alcohol and polyoxyethylene sorbitan monolaurate. After the organic peroxide aqueous emulsion is prepared, it is added to the polymerization reaction vessel to initiate polymerization of the selected ethylenically unsaturated material. The aforesaid emulsion is described as particularly adapted for use in those polymerization reactions which are conducted in an aqueous medium such as emulsion reactions which are conducted in an aqueous medium such as emulsion or suspension polymerizations of vinyl or vinylidene halide monomers. To insure that emulsions of the type described in the aforementioned patent are not broken by standing, agitation is applied to the emulsion to maintain its stability.

In the case of an emulsion of a highly reactive organic peroxide, phase separation can be a dangerous occurrence for the reason that a concentrated mass of undiluted organic peroxide results. Decomposition of such an undiluted mass of organic peroxide, depending on such things as the total mass, container, temperature of decomposition, etc., can result in a decomposition that is accompanied by the liberation of heat and flammable gases. Such conditions can lead to fires, deflagrations, pressure ruptures, and detonations.

It has now been discovered that organic peroxide emulsions that exhibit stability to freeze-thaw cycling, i.e., the emulsion can be frozen and does not phase separate or break upon thawing, can be prepared. More particularly, it has been found that liquid organic peroxide aqueous emulsions that comprise from about 30 to 75 weight percent organic peroxide, an emulsifying amount of surfactant(s) and the remainder water can be frozen and, when thawed, retain their emulsified state.

DETAILED DESCRIPTION

The present invention is directed to frozen aqueous emulsions of organic peroxide having a moderate to high concentration of organic peroxide. Such emulsions can be frozen without separation of the organic peroxide phase and water phase and, when thawed, retain their emulsified state at least for a period of time sufficient to allow safe handling and use. This characteristic, i.e., resistance to phase separation, of the aforesaid organic peroxide aqueous emulsion provides a significantly safer technique for storing, handling and shipping highly reactive organic peroxides than the techniques currently used.

The presence of water with the organic peroxide reduces significantly the hazards of fire normally associated with such materials. Indeed, tests with a forty weight percent (40%) aqueous emulsion of di-secondarybutyl peroxydicarbonate indicate that such a composition is essentially non-flammable. While the rate of homolytic decomposition of liquid aqueous peroxide emulsions is greater than corresponding (equal concentrations) solutions in hydrocarbon solvents, the greater degree of safety, e.g., the fire hazards, associated with such aqueous emulsions cannot be disregarded. Further, since the rate of homolytic decomposition of the organic peroxide aqueous emulsion can be rendered insignificantly by freezing the emulsion, a means is provided for producing a material that is both safer to store, handle and ship and that retains its assay for long periods of time.

The frozen organic peroxide aqueous emulsions of the present invention are useful when thawed as initiators for the suspension or emulsion polymerization of ethylenically unsaturated materials, e.g., vinylically unsaturated materials such as vinyl chloride. When thawed, the emulsions do not phase separate upon thawing and retain their active peroxide content for sufficient periods of time for the end user, i.e., the polymer manufacture, to make use of the peroxide as an initiator without significant loss of assay.

In one embodiment of the present invention the organic peroxide is the dispersed (discontinuous) or internal phase and the aqueous medium is the continuous or external phase. This embodiment is preferred because of the separation of the finite globules of organic peroxide one from another. In another embodiment, the aqueous medium is the dispersed (discontinuous) phase and the organic peroxide is the external or continuous phase. Both embodiments will be referred to herein as aqueous emulsions and provide means for diluting a highly reactive organic peroxide with water, thereby providing a safer material.

In accordance with the present invention there is provided organic peroxide aqueous emulsions that are resistant to phase separation (deemulsification) both during preparation of the frozen article and even when the frozen article is subsequently thawed. Such result is surprising since one of the suggested methods for breaking an emulsion is by subjecting the emulsion to a freeze-thaw cycle. In particular, organic peroxide aqueous emulsions are contemplated wherein the organic peroxide represents from 30 to 75 weight percent of the total liquid emulsion. More particularly, there are contemplated organic peroxide aqueous emulsions containing between about 35 and about 55 weight percent organic peroxide, preferably between about 40 and 50 weight percent organic peroxide. In contrast, it has been observed that relatively dilute, e.g., 5–20 weight percent of liquid aqueous emulsions of an organic peroxide, e.g., an aqueous emulsion of di-n-propyl peroxydicarbonate, phase separates on standing.

A frozen aqueous emulsion of organic peroxide which is stable to a freeze-thaw cycle has particular advantages. First, it is relatively safe and easy to handle and transport. Refrigerated transportation facilities and techniques already exist both for transcontinental and transoceanic shipments. Second, since the emulsion is frozen, it offers a self-contained heat sink so that in the event of some decomposition or refrigeration power failure, the latent heat of fusion of the water component of the frozen emulsion requires that a large amount of heat be absorbed before the product liquifies. This permits time for corrective or disposal measures. Third, since water is used, the emulsion, either frozen or liquid, is essentially non-flammable. Fourth, and in contrast to hydrocarbon-organic peroxide solutions, the high latent heat of vaporization of water provides an even greater heat sink in the event of an autoaccelerative decomposition. Fifth, since the frozen emulsion is stable to a freeze-thaw cycle, the frozen emulsion can be thawed and dispersed in aqueous medium to the concentration required while retaining its integrity as an emulsion. Thus, for example, if the end user requires a 10 percent emulsion, the frozen aqueous emulsion (water as the continuous phase), which for example may be a 40 weight percent organic peroxide, can be thawed and diluted with water (usually with agitation) to a concentration of 10 weight percent and this emulsion used. Finally, the rate of homolytic decomposition of the frozen emulsified organic peroxide is very low so that the assay of the organic peroxide remains fairly constant during the period of time the emulsion is frozen. Thus, the amount of peroxide available to the consumer at the time of use (thawing) is substantially the same as that which existed at the time the frozen emulsion is prepared.

The present invention is applicable to organic peroxides, i.e., an organic peroxy compound containing at least one —C-O-O-C— group, useful in the free radical polymerization of ethylenically unsaturated materials, and especially to organic peroxides used in the polymerization of such materials, in an aqueous medium, e.g., suspension or emulsion polymerizations. Thus, organic peroxides that can be used in the preparation of the herein described frozen articles can be represented by the general formula, A-C-O-O-C-B, wherein A and B represent the moiety of the organic peroxide compound other than the peroxy group.

The present invention is particularly useful for highly reactive organic peroxides for the reason that such organic peroxides are the most difficult to transport safely. Moderately reactive or slow reacting organic peroxides can be and are shipped currently in relatively undiluted form safely and do not require the same kind of safeguards in shipment, handling and storage required for the highly reactive peroxides. Preferably, the organic peroxides are liquid at the temperature at which the emulsion is prepared, as for example, ambient temperature, i.e., about 20° C.; however, the organic peroxide can be a solid at such temperature. In the latter case, the dispersed phase of the aqueous emulsion will be solid particles of the organic peroxide as contrasted to small globules of liquid organic peroxide. Further, the organic peroxide may be a solid, e.g., frozen, at the temperature at which the aqueous emulsion is frozen. While that latter physical states are more usually defined as a suspension, for convenience, the articles of the present invention will be referred to as aqueous emulsions even when the organic peroxide is a solid at either or both the temperature at which the emulsion is formed or the temperature at which it is frozen.

In a further embodiment, the organic peroxide which is to be emulsified can be in solution, i.e., in a compatible organic solvent. The solvents used to prepare solutions of the aforementioned peroxides are well known in the art and any of such solvents, e.g., mineral spirits, aliphatic or aromatic hydrocarbons, petroleum fractions, dimetylphthalate, etc., can be used. The particular solvent used is not critical to the present invention. In the event organic peroxide solutions are used, relatively concentrated solutions are required in order to prepare the moderately to highly concentraed liquid aqueous emulsions described herein. Thus, it is contemplated that organic peroxide solutions of at least 50 weight percent organic peroxide, more usually at least 75 weight percent, e.g., 85–90 percent, will be used.

The frozen articles of the present invention are solid articles with good integrity. In the embodiment in which water represents the continuous phase of the liquid emulsion, the frozen emulsion appears to be a dispersion of juxtaposed finite globules of organic peroxide encased in a matrix of frozen water. Surprisingly, the frozen article has excellent strength, i.e., it is not fragile and easily broken as an ice cube might be broken. This physical characteristic provides a further advantage for the articles of the present invention for the reason that handling becomes facilitated without the difficulties that can be associated with easily broken articles.

Among the organic peroxides useful in the present invention are the organic peroxydicarbonate esters, diacyl peroxides, acyl sulfonyl peroxides, and organic peroxyesters. The organic peroxydicarbonate esters can be represented by the following general formula:

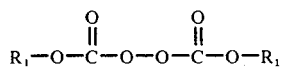   1.

wherein $R_1$ is an aliphatic radical of from 1 to 20, preferably from 2 to 12, more preferably from 2 to 8, e.g., 3 to 4 carbon atoms, or an aromatic radical of from 6 to 8 carbon atoms. More particularly, $R_1$ can be selected from the group consisting of methyl, ethyl, n-propyl, isopropyl, n-butyl, isobutyl, secondary butyl, tertiary butyl, capryl, 2-ethylhexyl, benzyl, cyclohexyl, 4-tertiary butyl and cyclohexyl radicals.

Peroxydicarbonate esters are well-known in the art and many are available in commercial quantities. The peroxydicarbonate esters are prepared typically by the careful reaction of the corresponding alkyl chloroformate with aqueous sodium peroxide at low temperatures, e.g., 0°–10°C., as described, for example in the Journal of American Chemical Society, Vol. 72, page 1254 (1950), and in U.S. Pat. 2,370,588. Specific examples of peroxydicarbonate esters are diethyl peroxydicarbonate, di(n-propyl) peroxydicarbonate, diisopropyl peroxydicarbonate di(n-butyl) peroxydicarbonate, di(secondary butyl) peroxydicarbonate, diisobutyl peroxydicarbonate, di(2-ethylhexyl) peroxydicarbonate, and di(4-tertiary butyl cyclohexyl) peroxydicarbonate.

The diacyl peroxides can be represented by the following general formula:

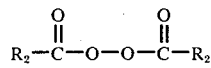   2.

wherein $R_2$ is an aliphatic radical of from 1 to 20, particularly 1–12, and more particularly from 1 to 4 carbon atoms or an aromatic radical of from 6 to 8 carbon atoms. Thus, $R_2$ can be the methyl, ethyl, n-propyl, isopropyl, n-butyl, secondary-butyl, tertiary-butyl, etc. radical. Of particular interest are diacetyl peroxide, dibenzoyl peroxide, dilauroyl peroxide and diisobutyryl peroxide, i.e., wherein $R_2$ is methyl and isopropyl. Diacyl peroxides are prepared commonly by treating the appropriate acid chloride or anhydride with sodium peroxide or with hydrogen peroxide in the presence of a base, e.g., pyridine. See for example, Organic peroxides, Vol. 1, p.65, D. Swern, Ed., John Wiley and Sons, N.Y., 1970.

The acyl sulfonyl peroxides, e.g., acetyl sulfonyl peroxides, can be represented by the general formula:

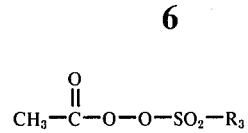   3.

wherein $R_3$ is an aliphatic radical of from 4 to 12 carbon atoms or a cycloaliphatic radical of from 3 to 10, e.g., 3 to 6, carbon atoms. Thus, $R_3$ can be cyclobutyl, cyclopentyl, cyclohexyl, n-butyl, sec-butyl, secondary heptyl, secondary dodecyl, secondary decyl, etc. Acyl sulfonyl peroxides of the type illustrated by the above formula, can be prepared by the sulfoxidation of the corresponding hydrocarbon from which $R_3$ is derived in the presence of acetic anhydride. The aforementioned method has been described in an article by L. Orthner entitled "The Introduction of Sulfo-Groups into Alkanes by Means of Sulphur Dioxide and Oxygen (Sulfoxidation)", Angew, Chem. 62 302-5 (1950) and an article by R. Graf entitled "Reaction mechanism of Sulfoxidation", Ann. Chem. 578, 50–82 (1952). Examples of acyl sulfonyl peroxides include: acetyl cyclopentylsulfonyl peroxide, acetyl cyclohexylsulfonyl peroxide, acetyl tertiarypentylsulfonyl peroxide, acetyl tertiarybutylsulfonyl peroxide, acetyl secondary-butylsulfonyl peroxide, acetyl secondarypentylsulfonyl peroxide, acetyl secondaryhexylsulfonyl peroxide, acetyl secondaryheptylsulfonyl peroxide, acetyl secondarynonylsulfonyl peroxide, acetyl 1-methylcyclopentylsulfonyl peroxide, and acetyl 1-methylcyclohexylsulfonyl peroxide.

The peroxyesters are the alkyl esters of peroxycarboxylic acids of from 2 to about 12 carbon atoms. The alkyl ester portion of the peroxyester usually contains 4 carbon atoms, e.g., tertiary butyl radical but can contain less or more carbon atoms. The peroxyesters can be represented by the general formula:

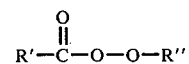   4.

wherein $R'$ is an aliphatic radical of from 2 to 12, e.g., 5 to 10, carbon atoms and $R''$ is an aliphatic of radical of from 1 to 8, e.g., 4 carbon atoms. Examples include tertiarybutyl peroxypivalate, tertiarybutyl peroctoate and tertiarybutyl perneodecanoate. The peroxyesters are generally prepared by treating alkyl hydroperoxide with an acylating agent. In terms of the formula (4)

for the aforementioned peroxyesters would be pivalyl, octanoyl and neodecanoyl.

The preparation of aqueous emulsions is well documented in the literature. Generally, the surfactant(s) is dissolved in the aqueous medium and, in the present invention, the organic peroxide added to the water phase with agitation. The order of addition of the two phases, i.e., whether the external phase is added to the internal phase or vice versa, is generally of no concern since an emulsion can be prepared by the well-known inversion technique. However, the unstable characteristics and hazards associated with large quantities of the organic peroxide suggest that it is best for the peroxide to be the discontinuous phase. Consequently, it is recommended that the organic peroxide be added slowly to the water phase to form the aqueous emulsion. In the embodiment in which the water phase is the discontinuous phase, the reverse order of addition can be used unless the inversion technique is used.

The temperature at which the emulsion is formed is not critical, but should be sufficiently reduced in order to avoid significant decomposition rates that would result in a loss of assay. The temperature that can be used will depend on the organic peroxide and the hazards or problems associated with handling the peroxide at a given temperature. For highly reactive organic peroxides, it is recommended that the temperature of the aqueous medium be in the range of between about +5° C. and about 20° C. In the event that the surfactant(s) require higher temperatures for dissolution in the aqueous medium, the surfactant-water solution should be cooled before the peroxide is added to it. In preparing the aqueous emulsion, deionized or distilled water will typically be used.

Equipment used to prepare the emulsion is similarly well known. Any of the well-known equipment which is capable of breaking up or dispersing the internal phase, e.g., organic peroxide, in the external phase, e.g., water medium, so that the particle size of the resulting emulsion is sufficiently small to retard coalesence and resulting breakdown of the emulsion in the required time of stability can be used. The choice of emulsification equipment is governed chiefly by the apparent viscosity of the emulsion in all stages of manufacture, the amount of mechanical energy input required and heat exchange demands, all of which are well known to persons skilled in the art. Examples of agitators capable of providing the proper degree of agitation are mechanically rotated paddle and anchor-type agitators; propeller agitation, i.e., one or more propellers mounted on a common shaft; turbine agitation, i.e., the use of fixed baffles, either on the mixing tank wall or adjacent to the propellers. Colloid mills and homogenizers are also suitable. Heat removal from the emulsion as it is being formed should be used to maintain the temperature of the total liquid medium below a temperature at which the organic peroxide undergoes significant homolytic decomposition.

The viscosity of the liquid emulsion that is formed can be varied depending on the amount of organic peroxide (and consequently the amount of water) that is used to form the liquid emulsion. The viscosity can be increased by known techniques such as by adding thickeners to the continuous phase, by increasing the amount of the internal phase or by reducing the particle size of the emulsion. The viscosity of the liquid emulsion can vary but should not be so viscous that the liquid emulsion cannot be handled by normal pumping means. Consequently, the liquid emulsion should be in a form that is pumpable so that it can be handled in a standard liquid handling equipment.

The liquid emulsion is then forwarded to a cooling zone wherein the emulsion is cooled and frozen. Any suitable cooling (refrigeration) equipment capable of reducing the temperature of the emulsion to at least −18° C. (0° F.) can be used. The emulsion can be frozen into any size suitable for handling, i.e., either flaked, powdered, granular or in larger forms such as a size analogous to ice cubes or larger. The larger the frozen article, the longer the time required to cool the emulsion to its freezing point and remove the latent heat of fusion of the aqueous medium. Therefore, for efficient cooling, the size of the individual article of frozen emulsion is small, e.g., the size of ice cubes (about 1 inch cubes) or pellets of ⅜ inch to 2 inches in diameter and one-fourth inch to three-fourths inch thick. Such a size would facilitate handling and provide flexibility in use so that a given amount of frozen peroxide emulsion could be thawed to produce a given quantity of liquid emulsified organic peroxide. The minimum amount is, of course, conditioned on the size of the solid article prepared. Temperatures to which the liquid emulsion is cooled to effect freezing can vary. Temperatures contemplated herein are those between about −30° C. and about −2° C., more typically between about −18° C. and −5° C., e.g., −18° C. At temperatures of −18° C. organic peroxides such as di-n-propyl peroxydicarbonate and di-secondarybutyl peroxydicarbonate are still liquid. Consequently, at such a temperature and with the peroxide as the discontinuous phase, the emulsified liquid percarbonate ester appears to be dispersed as globules in a matrix of the frozen aqueous phase.

Any type of indirect heat-transfer equipment for solidification that will not contaminate the solidified article can be used to prepare the frozen organic peroxide aqueous emulsions of the present invention. Examples of such suitable equipment are the table and belt-type units. The latter type is used for continuous solidification. In the aforementioned units, the liquid emulsion is fed onto a flat metal sheet or belt that is jacketed on the underside for coolant flow. The manner in which the liquid emulsion is fed will determine the type of product produced, e.g., flake, pellet, etc. The sheet can be equipped with forms, e.g., cubicles, to contain the liquid emulsion if the viscosity is too high or if a certain shaped product is desired. The frozen articles are then removed from the equipment manually or automatically.

Formation of a liquid emulsion is aided by the emulsifying agent (surfactant) used. The usual function of the emulsifying agent is to reduce interfacial tension and allow formation of the greatly enlarged interfacial area of the dispersed phase with a much reduced energy input via mechanical agitation. Thus the emulsifying agent is used to increase the ease of formation of the emulsion and/or promote the stability of the emulsion once formed. These actions are usually accompanied by reduction of interfacial tension between the two phases and by protective colloid behavior, respectively. The amount of emulsifier (hereinafter "surfactant") used in the preparation of the emulsion can vary; however, that amount which is sufficient to increase the ease of formation and promote stability of emulsion, i.e., an emulsifying amount, is used. Typically, the surfactant represents between about 1 and about 10 weight percent, more usually between about 3 and about 7 weight percent, e.g., about 5 weight percent of the emulsion. The exact amount of surfactant required can be ascertained easily by simply trial and error techniques using the aforementioned ranges as a guideline. Since surfactants are relatively expensive materials, only that amount which is required to accomplish the desired result (as described hereinbefore) are used commonly.

The surfactant should be soluble in the water phase to the extent required to perform the intended function and should remain dissolved in the water phase at all temperatures at which the emulsion is stored either as a frozen or as a liquid emulsion. Alternatively, the surfactant can be soluble in the oil phase when a peroxide solution is used. The surfactant should have a low chemical reactivity, i.e., it should be chemically inert or compatible with the organic peroxide, and further should be compatible chemically with the polymerization environment to which the liquid emulsion will be added.

A surfactant is an organic compound that encompasses in the same molecule two dissimilar structural groups, i.e., a water-soluble and a water-insoluble moiety. The composition, solubility, properties, location and relative sizes of these dissimilar groups in relation to the overall molecular configuration of the surfactant determine the surface activity of the surfactant. Water soluble surfactants are classified on the basis of the hydrophilic or solubilzing group into four categories; anionic, cationic, nonionic and amphoteric surfactants. The anionic solubilizing groups are carboxylates, sulfonates, sulfates and phosphates. Nonionic surfactants are solubilized by hydroxyl groups and polyoxyalkylene, e.g., polyoxyethylene, chains. Quaternary ammonium groups are cationic solubilizers. Amphoteric surfactants are solubilized by some combination of anionic and cationic moieties. In addition to the primary solubilizing groups, other structural units contribute to the hydrophilic tendencies of molecules, e.g., ester linkages and amide linkages.

Surfactant technology directs its principal attention to precisely specified properties of the surfactant rather than to its chemical composition. This is so for many reasons. Firstly, many surfactants are complex compounds that are not named easily by the generally accepted guidelines for naming chemical compounds. Secondly, surfactants are often mixtures of different compounds, i.e., they are prepared from commercial products which themselves vary in composition. For example, "cocoa acids" refers to the mixed fatty acids obtained from coconut oil. The components of complex surfactants are exceedingly difficult to separate. All of such factors, i.e., the complex composition of the surfactants, the difficulty of resolving mixtures of surfactant into their component parts and the lack of economic significance of such data, tend to minimize the importance of precise product descriptions in practical technology, as opposed to the properties of the surfactant. Consequently, surfactants are generally referred to in relatively broad generic terms and in terms of their properties.

As indicated hereinbefore, any surfactant which has the properties indicated and promotes the formation and stability of the organic peroxide emulsion can be used. The surfactant can be anionic, cationic, nonionic or amphoteric. Typically, the surfactant will be anionic or nonionic, more typically nonionic. Combinations of two or more surfactants or colloids are commonly used. Cationic and anionic surfactants are not used together since one would offset the surfactant properties of the other. The total amount of surfactant used will be in the amount described hereinbefore. Selection of a particularly useful surfactant for a particular organic peroxide can be facilitated by referring to the polymerization in which the organic peroxide emulsion will be used. In aqueous polymerization, i.e. emulsion or suspension polymerization of ethylenically unsaturated materials, emulsifiers and surfactants are used to maintain the polymer product dispersed within the aqueous polymerization medium. Anionic surfactants are commonly used with emulsion polymerizations while non-ionic surfactants find extensive use in suspension polymerizations. Since the surfactant used in the formulation of the organic peroxide emulsion must be compatible with the aqueous polymerization environment, it will be useful to select as the surfactant for use in the practice of the present invention one that is similar or identical to the emulsifier surfactant or suspending agent utilized in the polymerization medium.

The subject of emulsions is covered in detail in volume 8, pages 117–154 in the Kirk-Othmer Encyclopedia of Chemical Technology, second edition, John Wylie and Sons, Inc. 1965. A typical list of emulsifiers are presented on pages 128–130 of the aforementioned article. That article is hereby incorporated in toto by reference. The subject of surfactants is covered in volume 19 of the aforementioned Encyclopedia of Chemical Technology on pages 507–593, which article is also herein incorporated by reference. A brief discussion of the anionic, cationic and nonionic surfactants described in the aforementioned article follows.

Anionic Surfactants

Carboxylates -

The carboxylate class of surfactants are represented principally by the soaps and aminocarboxylates. Soaps have the general composition, $(RCOO)^-(M)^+$ wherein R is an alkyl group, usually in the $C_9 - C_{21}$ range and M is a metallic ion, e.g., alkali metal or alkaline earth metal such as sodium, potassium, magnesium, calcium, barium and iron, or hydrogen or an amine ion. The amine salts, i.e., wherein M is an amino group are excellent emulsifiers. Examples of $RCOO^-$ groups include, lauroyl, oleoyl, stearoyl, cocoyl, and tall oil acyl.

Sulfonates -

The sulfonate class of surfactants can be represented by the general formula, $R_4SO_3M$, wherein R is a hydrocarbon group in the surfactant molecular weight range and M is typically an alkali metal, e.g., sodium, ammonium or amine group. Generally, the sulfonates are alkylbenzenesulfonates, petroleum sulfonates, sulfosuccinates, naphthalenesulfonates N-acyl-N-alkyltaurates, $\beta$-sulfoesters of fatty acids, or $\alpha$-olefin sulfonates.

The alkylbenzenesulfonates, i.e., $R_4'C_6H_4SO_3M$, are widely used. $R_4'$ is typically $C_4$–$C_{14}$ alkyl, e.g., dodecyl, tridecyl, or nonyl, and M is sodium, calcium, hydrogen, ammonium or triethanolamino. Dialkyl sulfosuccinates are generally available as the sodium salt. The alkyl portion of the ester are in the $C_4$–$C_{14}$ range, mainly the $C_4$–$C_8$ range.

Naphthalenesulfonates, $R_5C_{10}H_6SO_3M$, are generally the salts of alkylnaphthalenesulfonates, salts of sulfonated formaldehyde-naphthalene condensates, salts of naphthalenesulfonates, and salts of tetrahydronaphthalenesulfonates, $R_5$ is typically $C_3$–$C_9$ alkyl. M is usually sodium or hydrogen.

Sulfates and Sulfated Products -

The sulfate surfactants are grouped generally into sulfated alcohols, sulfated natural fats and oils, sulfated acids, amides and esters, ethoxylated and sulfated alkylphenols and ethoxylated and sulfated alcohols. Alkyl sulfates $R_6OSO_3M$, are useful as emulsifiers and dispersants in emulsion polymerization. $R_6$ is typically $C_8$–$C_{18}$ alkyl, e.g., lauryl, 2-ethylhexyl, cetyl, oleyl, and octyl; while M is alkali alkaline earth metal, e.g., sodium potassium or magnesium, ammonium, triethanolamino, or diethanolamino.

Sulfated natural fats and oils are generally derivatives of tallow, castor oil, sperm oil, coconut oil, cod oil, neats'-foot oil, peanut oil and soybean oil. Sulfated polyoxyethylene alkylphenols, $R_7C_6H_4(OCH_2CH_2)_nOSO_3M$, are efficient emulsifiers and dispersants. $R_7$ is usually $C_9$ (nonyl), or $C_{12}$ (dodecyl), n is 2 to 5 and M is as defined hereinbefore, e.g., sodium, ammonium or triethanolamino. Sulfated polyoxyethylene alcohols, $R_8(OCH_2CH_2)_nOSO_3M$ are also useful in emulsion polymerization. $R_8$ is usually $C_{12}$–$C_{14}$, e.g., lauryl, tridecyl, or myristyl, $n$ is 1 to 4 and M is as defined hereinbefore, i.e., usually sodium, ammonium or triethanolamino.

Phosphate Esters -

Alkylphosphate and alkyl polyphosphate surfactants are also used as polymerization emulsifiers. The alkyl portion typically varies from $C_8$–$C_{18}$. Di(2-ethylhexyl) phosphate is typical of the orthophosphate esters, and a typical polyphosphate is $(2-ethylhexyl)_5-Na_5(P_3O_{10})_2$.

Nonionic Surfactants

Nonionic surfactants can be classed into the following groups: ethoxylated alkylphenols, ethoxylated aliphatic alcohols, carboxylic esters, carboxylic amides and polyoxyalkylene oxide block copolymers.

Ethoxylated alkylphenols -

These nonionic surfactants are prepared from $C_6$–$C_{12}$ alkyl substituted phenols. The number of moles of ethylene oxide per mole of hydrophobe (alkyl phenol) can vary between 1.5 and about 30. The weight percent of combined ethylene oxide is usually from 40–95 percent to achieve good water solubility, more typically 60–95 percent. Nonylphenoxypoly (ethyleneoxy) ethanol is an example of this type of material.

Ethoxylated Aliphatic Alcohols -

These nonionic surfactants are generally prepared from $C_{12}$–$C_{18}$ alcohols or mixtures of alcohols of that chain length and the mole ratio of combined ethylene oxide to hydrophobe varies from about 1 to 50, more often from 4 to 20. Examples of alcohols that can be ethoxylated are lauryl, oleyl, cetyl, stearyl, tridecyl, myristyl, trimethylnonyl, $C_{12}$–$C_{15}$ primary linear and $C_{11}$–$C_{15}$ secondary alcohol.

Carboxylic Esters -

Examples of these type of surfactants are the glycerol esters, polyethylene glycol esters, anhydrosorbitol esters, ethoxylated anhydrosorbitol esters, ethylene and diethylene glycol esters, propanediol esters and ethoxylated natural fats and oils. The glycerol esters are either mono- or diglycerides of fatty acids, usually $C_{12}$–$C_{18}$ fatty acids. The polyethylene glycol-esters are also esters of fatty, rosin, and tall oil acids. The fatty acids also generally contain 12 to 18 carbon atoms.

The mono-, di- or triesters of sorbitan and fatty acids are the most typical commercially available fatty acid esters of anhydrosorbitol. Sorbitan is a mixture of anhydrosorbitols of which 1,4sorbitan and isosorbide are the principal components. The fatty acids are typically the $C_{12}$–$C_{18}$ fatty acids. Ethoxylation of the sorbitan fatty acid esters leads to a series of more hydrophilic surfactants. The number of oxyethylene units per mole of ester varies usually between 4 and 20.

The ethylene glycol, diethylene glycol and 1,2-propanediol esters of fatty acids having 12 to 18 carbon atoms are also used as surfactants. Ethoxylated castor oil and lanolin derivatives are the significant volume products of the ethoxylated natural fats and oils.

Polyvinyl Alcohol -

Polyvinyl alcohol (PVA) is a hydrophilic colloid resin prepared by the acid or alkaline hydrolysis of a vinyl polymer, usually poly(vinyl acetate). The molecular weight of the PVA depends on the molecular weight of the parent polymer. The degree of hydrolysis of the parent polymer will vary the properties of the PVA. For use as a water soluble surfactant, hydrolysis should be substantial, e.g., 65 percent or more of the acetate groups should by hydrolyzed. The weight average molecular weight of the parent poly(vinyl acetate) is reported to vary between 11,000 and 1,500,000.

Cationic Surfactants

The hydrophilic moieties in cationic surfactants are usually the quaternary nitrogens. The quaternary ammonium salts can be categorized into dialkyldimethylammonium salts, alkylbenzyldimethylammonium salts (chlorides), alkyltrimethylammonium salts and alkylpyridinium halides. The quaternary salts are usually halides, e.g., chlorides or bromides, sulfates or sulfonates.

Water-Soluble Cellulose Ethers

Water-soluble cellulose ethers can also be used as surfactants in the present process. The cellulose ethers of commercial importance can be classified into three types. They are: (1) ionic-carboxymethylcellulose, e.g., sodium carboxymethylcellulose, (2) hydroxyalkylcellulose, e.g., hydroxyethylcellulose and (3) nonionic-alkylcellulose, e.g., methylcellulose.

Sodium carboxymethylcellulose is a hydrophilic colloid that is anionic in character and is useful for stabilizing emulsions. A derivative, sodium carboxymethylhydroxyethylcellulose, is less sensitive to precipitation by salt solutions and acid, and is also useful in preparing the emulsions of the present process. Hydroxyethylcellulose is the principal commercial hydroxyalkylcellulose, however, hydroxypropylcellulose can also be used. Examples of alkyl cellulose include methylcellulose and ethylcellulose. Other water-soluble ethers include methylhydroxypropylcellulose, ethylhydroxyethylcellulose and methylethylcellulose. The degree of substitution (the average number of hydroxyl groups of the three available in the anhydroglucose unit that have been substituted) of the aforementioned cellulose ethers is usually at least about 0.5 and preferably at least 0.8 in order to attain water solubility.

Other hydrophilic-organic colloids that can be used in the present process in addition to the surfactants include the vegetable and other gums, e.g., starch, gelatin, pectin, and sodium alginate; and, inorganic suspending agents, such as the clays, bentonites and other finely-divided solids. For ease of reference, all of the aforementioned ingredients used to emulsify the peroxide (other than water) will be referred to as surfactants.

The remaining portion of the liquid emulsion (other than organic peroxide and surfactant[s]) is water. The water is usually deionized, or demineralized and deionized water to prevent the introduction of contaminants into the system in which the emulsion is used. Based on the described amount of organic peroxide and surfactant used to prepare the liquid emulsion, the difference represents between about 15 and about 70 weight percent water, typically between 40 and 60, e.g., 55, weight percent water. If peroxide hydrocarbon solutions are used the amount of water required will vary further. While general statements can be made with respect to the amount of water and surfactant used, the particular amount of each used will be that which is sufficient to provide a stable aqueous emulsion of moderate to high organic peroxide concentration, as defined herein.

The present process is more particularly described in the following examples which are intended as illustrative only since numerous modifications and variations therein will be apparent to those skilled in the art.

EXAMPLE 1

A liquid aqueous emulsion of di(secondary butyl) peroxydicarbonate was prepared by adding 5 grams of polyvinylalcohol surfactant (88% hydrolyzed) to 55 grams of water at 5° C. to wet the surfactant. The mixture was warmed to 65° C. and held for one hour with agitation to dissolve the surfactant. This solution was stored overnight at about 0° C. after allowing the solution to reach room temperature, 40 grams of the peroxydicarbonate were added and the mixture agitated for 30 minutes at 5 to 10° C. to prepare the emulsion. The emulsion was maintained at +10° C. After 8, 15, 21, 27 and 40 days, the assay of the peroxydicarbonate emulsion was determined, i.e., the amount of undecomposed peroxydicarbonate in the emulsion was measured. Results are tabulated in Table I.

EXAMPLE 2

The procedure of Example 1 was followed except that 75 grams of water and 20 grams of di(secondary butyl) peroxydicarbonate was used. The assay of this 20 weight percent emulsion was measured at the same intervals as Example 1 and the results are tabulated in Table I.

EXAMPLE 3

A 40 weight percent solution of di(secondary butyl) peroxydicarbonate in mineral spirits was prepared and maintained at +10° C. After 6, 14, 21, 27 and 40 days, the assay of the peroxydicarbonate was measured. Results are tabulated in Table I.

EXAMPLE 4

A 20 weight percent solution of di(secondary butyl) peroxydicarbonate in mineral spirits was prepared and maintained at +10° C. After 7, 14, 21, 27 and 40 days, the assay of the peroxydicarbonate was measured. Results are tabulated in Table I.

EXAMPLE 5

In accordance with the procedure of Example 1, a 40 weight percent liquid emulsion of di(secondary butyl) peroxydicarbonate and a separate 40 weight percent liquid emulsion of di(n-propyl) peroxydicarbonate were prepared. These emulsions were maintained at −4° C. and samples analyzed for oxygen content at various time intervals. At −4° C., the emulsions were still liquids, i.e., they would still flow and would conform to the container into which it might be placed. By the 21st day, the di(n-propyl) peroxydicarbonate liquid emulsion had phase separated and after 102 days had lost 70 percent of its original active oxygen content. The di(secondary butyl) peroxydicarbonate emulsion did not phase separate, and, after 103 days, was found to have lost about 8 percent of its original active oxygen content.

EXAMPLE 6

In accordance with the procedure of Example 1, a 40 weight percent emulsion of di(secondary butyl) peroxydicarbonate was prepared. The emulsion was poured into a plastic ice cube tray and cooled to −23° C. The resulting frozen cubes (about 1 inch cube) were hard, nonfriable, handled easily and stored well.

EXAMPLE 7

The procedure of Example 6 was followed except that aliquot samples of the emulsion were frozen in ampules. At various time intervals, individual ampules were analyzed for oxygen content. After 108 days, there was no measurable loss in active oxygen content.

The data of Examples 6-7 show that frozen aqueous emulsions of organic peroxides, e.g., peroxydicarbonates, are stable and easy to handle. The data of Example 5 indicates that insufficient surfactant(s) was used to prevent phase separation of the liquid di(n-propyl) peroxydicarbonate by the 21st day although the amount of surfactant (5 percent) used was sufficient to prevent phase separation of the di(secondary butyl) peroxydicarbonate liquid emulsion.

EXAMPLE 8

Forty pounds of a 40 weight percent di(secondary

TABLE I

| | ASSAY (% Peroxydicarbonate) STORAGE AT 10° C. | | | |
|---|---|---|---|---|
| Interval Days | Example 1 40 % Emulsion | Example 2 20 % Emulsion | Example 3 40 % Solution | Example 4 20 % Solution |
| 0 | 39.50 | 19.78 | 39.66 | 20.04 |
| 6 | | | 37.97 | |
| 7 | | | | 19.66 |
| 8 | 30.90 | 16.52 | | |
| 14 | | | 37.00 | 19.16 |
| 15 | 19.83 | 13.75 | | |
| 21 | 11.52 | 11.28 | 36.08 | 18.78 |
| 27 | 7.51 | 9.16 | 35.57 | 18.52 |
| 40 | 4.62 | 6.15 | 34.60 | 18.00 |

The data of Table I show that liquid emulsions of organic peroxydicarbonates are more unstable than corresponding solutions in hydrocarbon solvents, e.g., mineral spirits. For example, after 15 days the 40% emulsion (Example 1) had lost about 50% of its assay; while after 14 days the 40% solution had lost less than 7% of its assay. Similarly, after 15 days, the 20% emulsion had lost about 30% of its assay; while after 14 days the 20% solution had lost about 4.4%.

butyl) peroxydicarbonate liquid aqueous emulsion were prepared in accordance with the procedure of Example 1. The emulsion was placed in an uncovered five-gallon metal can and the can placed in a water bath that had a temperature of about 50° C. The initial temperature of the emulsion was about 20° C. Decomposition of the percarbonate was evidenced by small bubbles rising to the top of the emulsion. Eventually, the emulsion began to foam and overflowed its container.

Overflow decomposition continued for about 15 minutes. Attempts to ignite the foam with a benzamitic torch attached to an 8 foot rod were not successful. After long exposure to the flame of the torch, it was possible to dry the foam to a film which could be charred.

EXAMPLE 9

The procedure of Example 8 was followed except that the metal can was placed directly on a charcoal fire prepared from 10 pounds of charcoal. The emulsion had a temperature of 24° C. when the can was placed on the charcoal. After warming to decomposition temperature, the emulsion foamed up and over the sides of the can as in Example 8. Direct contact of the foam with the charcoal did not result in ignition of the foam. Ignition of the foam was attempted with a benzamitic torch attached to an 8 foot rod; however, ignition could not be obtained.

EXAMPLE 10

Forty pounds of a 40 weight percent solution of di(-secondary butyl) peroxydicarbonate in odorless mineral spirits were prepared and poured into a five-gallon metal can. The can held only about 37 pounds. A wick was dipped into the solution and hung over the side of the can. The wick was ignited with the benzamitic torch attached to an 8 foot rod. This ignited the solution in the can which burned quickly and very vigorously.

The data of Examples 8–10 show that aqueous emulsions of peroxydicarbonates are essentially non-flammable; while solutions of peroxydicarbonates in mineral spirits are easily ignited.

Although the present invention has been described with reference to specific details of certain embodiments thereof, it is not intended that such details should be regarded as limitations upon the scope of the invention except as and to the extent that they are included in the accompanying claims.

We claim:

1. A frozen organic peroxide aqueous emulsion comprising (a) from 30 to 75 weight percent of organic peroxide selected from the group.

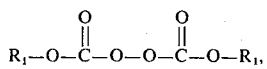    1.

wherein $R_1$ is an aliphatic radical of from 1 to 20 carbon atoms or an aromatic radical of from 6 to 8 carbon atoms,

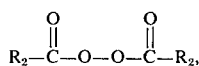    2.

wherein $R_2$ is an aliphatic radical of from 1 to 20 carbon atoms or an aromatic radical of from 6 to 8 carbon atoms,

    3.

wherein $R_3$ is an aliphatic radical of from 4 to 12 carbon atoms or a cycloaliphatic radical of from 3 to 10 carbon atoms, and

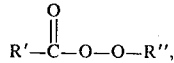    4.

wherein R' is an aliphatic radical of from 2 to 12 carbon atoms and R" is an aliphatic radical of from 1 to 8 carbon atoms, (b) an emulsifying amount of water soluble surfactant, and (c) the remainder water.

2. The frozen emulsion of claim 1 wherein the organic peroxide represents from 35 to 55 weight percent of the emulsion.

3. The frozen emulsion of claim 2 wherein the organic peroxide represents from 40 to 50 weight percent of the emulsion.

4. The frozen emulsion of claim 1 wherein from about 1 to 10 weight percent of surfactant is used.

5. The frozen emulsion of claim 1 wherein the surfactant is non-ionic.

6. The frozen emulsion of claim 5 wherein the surfactant is polyvinyl alcohol.

7. The frozen emulsion of claim 1 wherein the continuous phase of the emulsion is the aqueous phase.

8. A frozen organic peroxide aqueous emulsion comprising (a) from 35 to 55 weight percent of organic peroxide selected from the group,

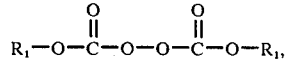    1.

wherein $R_1$ is an aliphatic radical containing from 2 to 8 carbon atoms,

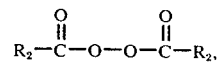    2.

wherein $R_2$ is an aliphatic radical of from 1 to 4 carbon atoms,

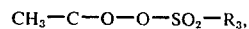    3.

wherein $R_3$ is an aliphatic radical of from 4 to 12 carbon atoms or a cycloaliphatic radical of from 3 to 6 carbon atoms, and

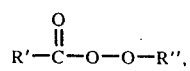    4.

wherein R' is an aliphatic radical of from 5 to 10 carbon atoms and R" is the tertiarybutyl radical, (b) an emulsifying amount of water soluble surfactant, and (c) the remainder water.

9. The frozen emulsion of claim 8 wherein the organic peroxide represents from about 40 to about 50 weight percent of the emulsion.

10. The frozen emulsion of claim 8 wherein $R_1$ is ethyl, n-propyl, isopropyl, n-butyl, secondary butyl, isobutyl or 2-ethylhexyl; $R_2$ is methyl, isopropyl or tertiary butyl; $R_3$ is cyclohexyl; and

is pivalyl, octanoyl or neodecanoyl.

11. The frozen emulsion of claim 8 wherein from about 3 to about 7 weight percent of surfactant is used.

12. The frozen emulsion of claim 11 wherein the surfactant is a non-ionic surfactant.

13. The frozen emulsion of claim 12 wherein the surfactant is polyvinyl alcohol.

14. The frozen emulsion of claim 11 wherein the surfactant is a water-soluble cellulose ether.

15. The frozen emulsion of claim 11 wherein the surfactant is gelatin.

16. The emulsion of claim 14 wherein the surfactant is sodium carboxymethylcellulose, hydroxyethylcellulose or methylcellulose.

17. The emulsion of claim 8 wherein the surfactant is sorbitan esters of $C_{12}$–$C_{18}$ fatty acids.

18. The emulsion of claim 8 wherein the surfactant is selected from anionic surfactants, non-ionic surgactants or a combination of anionic and non-ionic surfactants.

19. A frozen peroxydicarbonate ester aqueous emulsion comprising (a) from 35 to 55 weight percent of peroxydicarbonate ester represented by the formula,

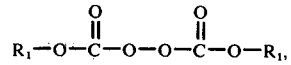

wherein $R_1$ is an aliphatic radical of from 2 to 8 carbon atoms, (b) from about 3 to 7 weight percent of non-ionic water soluble surfactant, and (c) the remainder water, the frozen emulsion being a dispersion of finite globules or particles of peroxydicarbonate ester within a continuous frozen aqueous matrix.

20. The frozen emulsion of claim 19 wherein the surfactant is polyvinyl alcohol.

* * * * *

UNITED STATES PATENT AND TRADEMARK OFFICE
CERTIFICATE OF CORRECTION

PATENT NO. : 3,988,261
DATED : October 26, 1976
INVENTOR(S) : James A. Barter, Henry C. Stevens and John F. Van Hoozer It is certified that error appears in the above-identified patent and that said Letters Patent are hereby corrected as shown below:

Claim 1, column 15, line 60 should read (3) $\quad CH_3-\overset{\overset{O}{\|}}{C}-O-O-SO_2-R_3$ Claim 8, column 16, line 40 should read (3) $\quad CH_3-\overset{\overset{O}{\|}}{C}-O-O-SO_2-R_3$ Claim 10, column 16, line 65 should read $R'-\overset{\overset{O}{\|}}{C}-$ Signed and Sealed this Twenty-second Day of February 1977

[SEAL]

Attest:

RUTH C. MASON
*Attesting Officer*

C. MARSHALL DANN
*Commissioner of Patents and Trademarks*